United States Patent [19]

Zwick

[11] Patent Number: 5,701,340
[45] Date of Patent: Dec. 23, 1997

[54] AD-HOC CONFERENCING METHOD

[75] Inventor: Nicholas Zwick, Far Hills, N.J.

[73] Assignee: Dialogic Corporation, Parsippany, N.J.

[21] Appl. No.: 559,606

[22] Filed: Nov. 20, 1995

[51] Int. Cl.[6] .................................................. H04M 3/42
[52] U.S. Cl. .......................... 379/204; 370/260; 370/261; 379/205
[58] Field of Search .............................. 370/62, 260, 261, 370/262; 379/202, 203, 204, 205, 206, 215

[56] References Cited

U.S. PATENT DOCUMENTS

| | | |
|---|---|---|
| 4,317,961 | 3/1982 | Johnson ................................. 379/204 |
| 4,577,065 | 3/1986 | Frey et al. ................................ 379/204 |
| 5,369,694 | 11/1994 | Bales et al. .......................... 379/202 X |
| 5,483,588 | 1/1996 | Eaton et al. .......................... 379/204 X |

*Primary Examiner*—Harry S. Hong
*Attorney, Agent, or Firm*—Jeffrey I. Kaplan, Esq.

[57] ABSTRACT

An improved conferencing protocol is disclosed wherein users telephone a predetermined number and enter any conference identifier arranged among themselves. Users entering a common conference identifier are connected with one another.

12 Claims, 3 Drawing Sheets

5,701,340

AD-HOC CONFERENCING METHOD

TECHNICAL FIELD

This invention relates to telephone switching, and more particularly, to an improved technique and protocol for establishing conferences among predetermined groups of users in a call processing system.

BACKGROUND OF THE INVENTION

Call conferencing is a common technique for multiple parties at remote locations to communicate with one another. Utilizing the present day techniques, several options are available to a group of three or more users who desire to have a conference call. One option is that a user telephones, from his local telephone system, a plurality of different users, each on a separate telephone line, and then uses local telephone conference capability to patch all of the conferees together. One drawback of this arrangement is that if the user only has a small number of telephone lines, they will all be used up with the conference. Additionally, it is somewhat cumbersome to the user to have to dial several numbers and then go through the protocol to connect all of the conferees. Many times one or more conferees become disconnected.

A second option is offered by many telephone companies such as AT&T. The second option typically involves telephoning an operator, in advance, and giving the operator a list of all of the conferees with their telephone numbers, as well as the time that the conference call is desirable. The operator then telephones all of the conferees, one by one, at the appropriate time, and connects them all together via a bridging circuit which exists at the telephone company's switch.

The second option is undesirable for several reasons. First, control of the conference is centralized at a single operator. This requires human intervention and increases cost. Additionally, it is usually expected that each conferee will be available at his telephone when the operator calls. While some systems allow the conferees to call in rather than wait to be called by the operator, even these call in systems require the operator to answer the telephone and verify the person calling, and perhaps other information, before connecting the conferee to the conference.

Still other conferencing systems provide a 900 number that users call. The users are presented with a menu of different conferences, and by pushing different DTMF digits, may enter and exit various different conferences. Importantly, however, the particular conference entered or exited must be prearranged by the conferencing system, and a user who enters a DTMF tone or sequence of tones which is not recognized by the conferencing system is simply either disconnected, or informed that the entry is incorrect. Accordingly, the control is still centralized at the conference systems, meaning that the conference system must know in advance the particular sequence of DTMF tones allocated to each particular conference.

To date, there exists no known technique for permitting a group of users to arrange for a conference among themselves, on an "ad-hoc" basis, without intervention from a centralized operator or service.

In view of the above, it can be appreciated that there exists a need for an improved technique to allow a plurality of conferees to arrange for and implement a conference call.

SUMMARY OF THE INVENTION

The above and other problems of the prior art are overcome in accordance with the present invention which relates to a technique for allowing a plurality of conferees to arrange for and implement a conference call without any human intervention and without the cumbersome techniques of manually adding users one by one as in the prior art. In accordance with the invention, a predetermined telephone number is dialed by any and all of the conferees who wish to participate. The conferees have a predetermined conference identifier, which they have selected among themselves.

When it is desired to arrange for the conference, each conferee dials the predetermined telephone number and is prompted to enter a conference identifier. The conference identifier is entered and if a conference based upon the conference identifier is set up already then the conferee is added to that conference. If no conference is set up based upon that conference identifier, then the system sends a holding message to the conferee and awaits others to dial in with the same conference identifier, at which time the conference is set up. If no others dial within a particular time period, the system may optionally end the connection by hanging up.

Thus, the system simply sets up new conferences based on each new conference identifier entered, and whenever other conferees enter the same conference identifier, they are simply connected to a conference based upon that conference identifier. The switch need not be preprogrammed with any type of prearranged password, since any conference identifier may be selected by the users.

DETAILED DESCRIPTION OF THE PREFERRED EMBODIMENT

Figure 1:
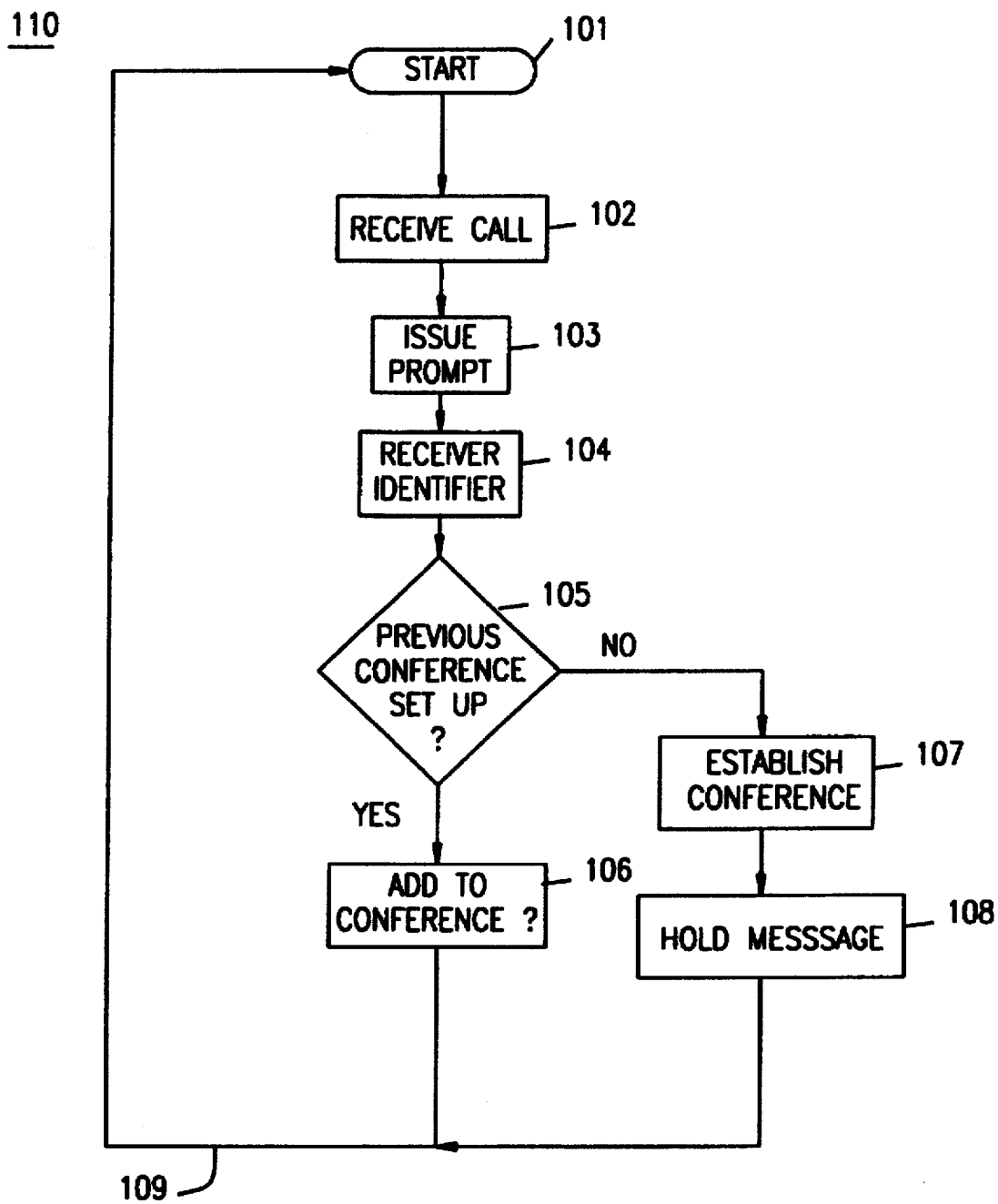
FIG. 1 shows a flow chart which is intended to represent the steps to be implemented at a switch or conference bridge in order to implement an exemplary embodiment of the present invention.

FIG. 1 shows a high level flow chart of the appropriate operational blocks and decision points to be utilized for implementation of an exemplary embodiment of the present invention. The software shown in FIG. 1 may be implemented at a switching arrangement and/or conferencing bridge.

At start 101 the software is entered and control is immediately transferred to operational block 102 where a call is received. After answering the call, the conference bridge issues a prompt to the caller. The prompt may be a message from a menu, such as "enter a four digit conference identifier to be used for this conference" or other such similar message. The conference identifier may be fixed or variable in length and can be restricted in any other way desirable.

At block 104, the entered conference identifier is received and transferred to decision point 105. Decision point 105 checks to see if a conference has already been set up based upon the entered conference identifier. Presuming it has, there would be at least one other user who has previously entered the same conference identifier. In such case, operational block 106 adds the new user to the existing conference by connecting the new user to the one or more other conferees who have previously entered the same conference identifier. After processing block 106, the software returns to start 101 to await the arrival of subsequent calls.

When a new conferee enters an existing conference, one or more security features may be utilized. As one optional feature, when the system determines at block 105 that a new conferee has entered the conference identifier, it can signal the one or more other conferees that such a new conferee has entered the conference. Optionally, ANI data received from the newly added conferee can be sent to the other conferees, so that they know the telephone number or other identifying information regarding the new conferee. Thus, a voice message could announce to all conferees "Excuse me, a new conferee has just entered from 201-993-3000." The other conferees may know the person at that number, and thus, will have a good idea who is entering.

Additionally, before adding any additional conferees, the system could check with existing conferees. For example, when the conference identifier is received, the system could prompt one of the existing conferees, say the first one, that a new conferee desires to enter the conference. The first user may grant permission by entering a first tone, or deny permission by entering a second tone. The system then adds the new conferee only if appropriate.

If decision point 105 determines that there are no other off hook lines which have previously entered the same conference identifier, then a conference is established at operational block 107. In such a case, the calling party is effectively placed on hold and hold message 108, such as music, advertisements, etc. may be played to the calling party. The system returns to start 101 and awaits the arrival of the next call. As soon as the subsequent caller enters the same conference identifier, the immediate next loop through the flow chart of FIG. 1 will cause decision point 105 to recognize that a previous caller has entered the same conference identifier, and block 106 will establish the conference.

In the case of the second caller of the conference, it is also necessary to disconnect any hold message so that music, for example, does not continue to be played to the conferees once the conference is established. This task can be accomplished by a variety of techniques well known to those of ordinary skill in the art. The straightforward technique is to simply disconnect the hold message from any outgoing line as soon as an additional party is connected to the outgoing line. Techniques for accomplishing this are well known to those of ordinary skill of the art and exist already, for example, in systems where a caller hears a hold message until a voice processing system transmits the call to a local agent.

Each conferee's telephone number can be recorded, along with other billing information, in order to keep audit trails and assist in system accounting. Other parameters, such as call length, time of origination, etc., may also be stored for use by the system administrator.

It should also be noted that the conference identifier may be a prestored speed dial number in the conferee's telephone. Alternatively, in computers which contain a speakerphone, the conference identifier could be stored on the hard disk. The user of such a computer would have several icons displayed, and each icon represents a particular conference identifier. The "clicking" of a particular icon initiates or joins a conference by sending a stored conference identifier to the conference system.

Figure 2:
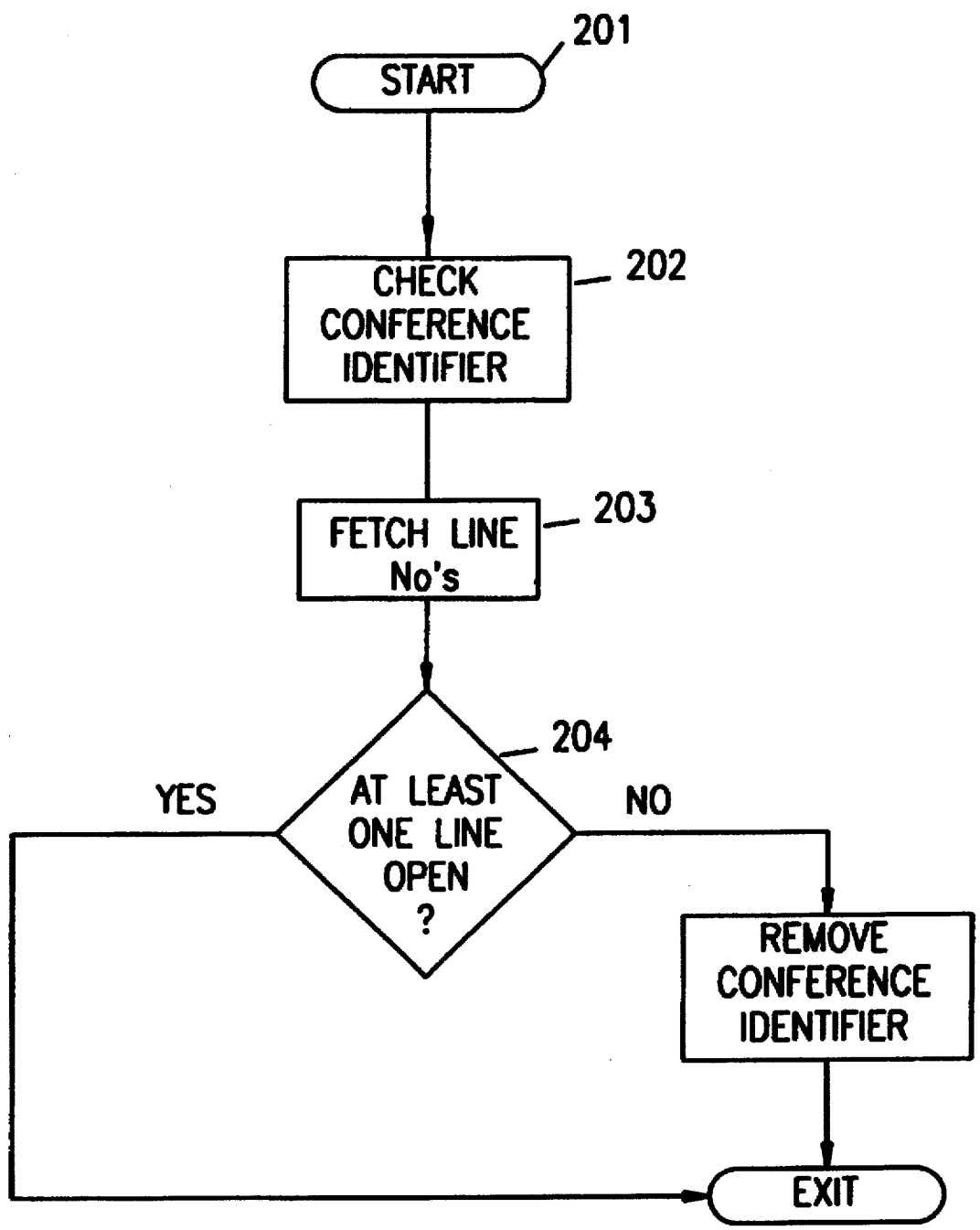
FIG. 2 shows a flow chart for ending each conference.

Also required is a technique for ensuring that the conference ends once all of the callers hang up. FIG. 2 is a flow chart for implementing such a technique. The flow chart of FIG. 2 may be inserted as a subroutine between points 109 and 110 in the flow chart of FIG. 1, or may be run at other parts of the loop shown in FIG. 1.

Before turning to the details of the flow chart of FIG. 2, it is necessary to understand the purpose thereof. The purpose of the arrangement of FIG. 2 is to keep track of all of the conferences which are presently taking place in the conference bridge. Each conference has an associated conference identifier. When all of the conferees from the conference associated with a particular conference identifier hang up, the conference identifier is removed from the table storing all current conferences, and the conference is ended.

Turning to the flow chart of FIG. 2, the subroutine is entered at start 201 and control is transferred to check conference identifier table 202. Block 202 checks the first conference identifier in a table of conference identifiers, each of which corresponds to a presently pending conference call. The table includes not only a list of conference identifiers, but a list of the particular telephone lines emanating from the conference bridge which are involved in each conference.

After checking the next conference identifier in the table, the line numbers associated with that conference identifier are fetched at block 203, and decision point 204 determines if at least one of those lines is still open. If so, the subroutine is simply exited to be executed again during the next loop of FIG. 1. Of course, the conference identifier table pointer is moved by one notch so that the next conference identifier of the table will be checked during the next time through the loop.

If, on the other hand, decision point 204 determines that none of the lines associated with that particular conference identifier are open, then the conference identifier is removed from the conference identifier table and the conference is then ended. Of course, that conference identifier can be used for future conferences.

Figure 3:
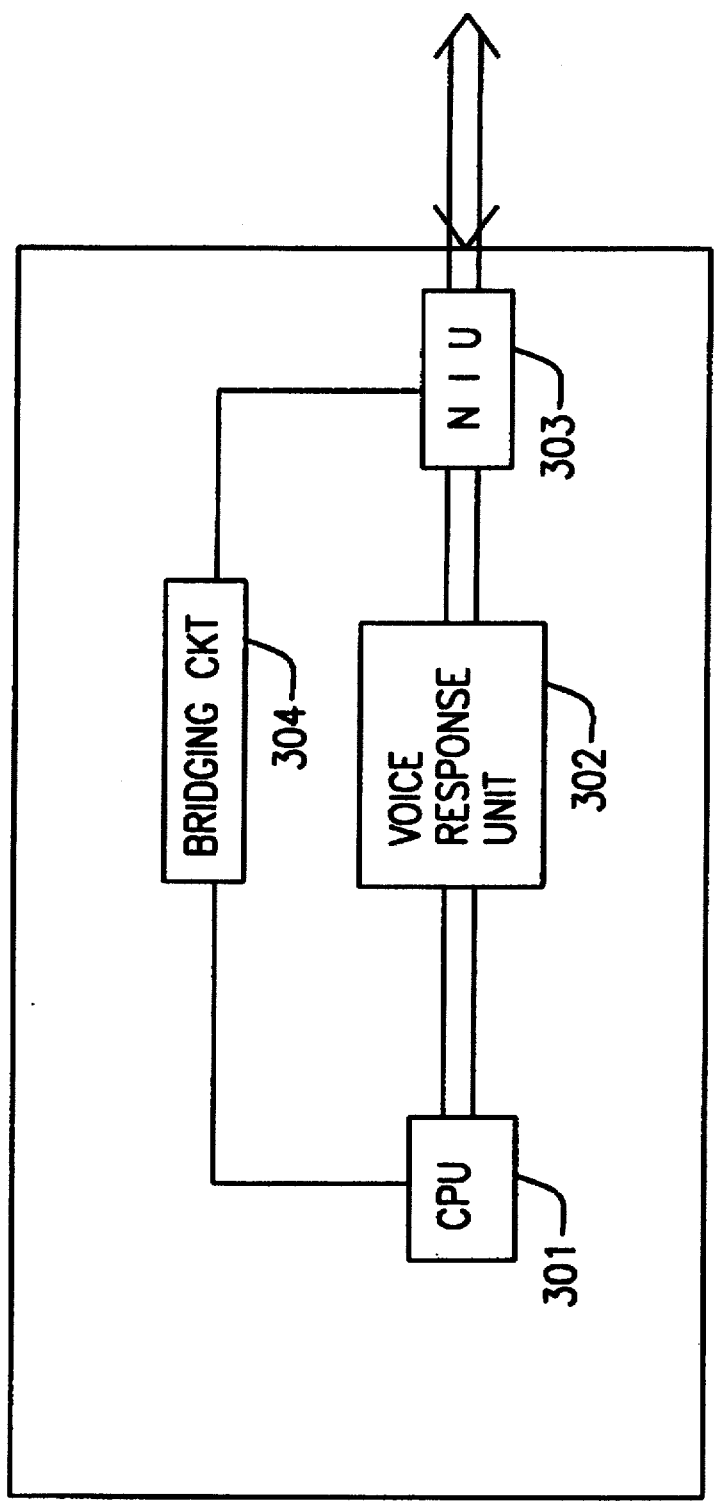
FIG. 3 shows a conceptual block diagram of a portion of the hardware utilized to implement the exemplary embodiment of FIG. 1.

FIG. 3 shows a basic block diagram of a voice processing hardware which can be utilized to implement the present invention. The arrangement of FIG. 3 includes a CPU 301, the bridging circuit 304, a network interface unit 303, and a voice response unit 302. The arrangement of FIG. 3 is a typical voice board known to those in the voice processing industry, and need not be discussed in great detail. The arrangement of FIG. 3 may be implemented, for example, using a D/240SC-T1 and MSI/80-SC board, both available from DIALOGIC CORPORATION, Parsippany, N.J., and a standard PC. Suffice it to say that the arrangement of FIG. 3 can accept DTMF commands through voice response unit 302, process those commands in CPU 301, and instruct bridging circuit 304, from CPU 301, to bridge the appropriate connection together. Such an arrangement is well known to those of ordinary skill in this art.

While the above describes the preferred embodiment of the invention, various modifications and/or additions will be apparent to those of ordinary skill in the art. For example, the conference may be initiated by outbound calls from the switch. In such a case, a conferee who enters the appropriate conference identifier is connected to the conference. Thus, for example, a first user could call the switch and enter the conference identifier and the telephone numbers of the other conferees. Thereafter, the switch calls the other conferees and awaits entry of the conference identifier for connection of the conference.

Alternatively, the switch could be instructed to make the outbound calls via a separate data network as described in the application entitled "Telephone Call Setup Procedure" owned by the assignee of the present invention and filed as Ser. No. 08/541,678, and hereby incorporated by reference. Thus, several users communicating via an electronic bulletin board could agree on a common conference identifier. The telephone numbers of the desired conferees get transmitted to the switch, and the conferees are then telephoned for a conference in accordance with the conference identifier technique described hereinbefore.

Another enhancement involves error checking. If a potential conferee enters a conference identifier that is not presently in use, the system, as previously described, sets up a new conference. However, the entered conference identifier may actually be an erroneously entered conference identifier that was intended to designate the conference identifier of an existing conference. In order to help protect against such a scenario, each time an unused conference identifier is entered, the system could prompt the user to confirm that a new conference is desired.

Additionally, the system could issue such a prompt only if the conference identifier entered and an existing conference identifier are close (e.g. differ by only one digit). Such modifications are intended to be covered by the following claims.

What is claimed is:

1. A method of implementing a call conference comprising:
   receiving from a first conferee, a conference identifier at a switch;
   determining if said identifier was previously entered by a second conferee;
   if not, maintaining a connection between the switch and the first conferee, wherein, said conference identifier has not been previously allocated for said call conference by said switch.

2. A method of implementing a call conference in a conference system among a plurality of users comprising the steps of:
   initially receiving a conference identifier from a potential conferee which conference identifier has not been previously allocated for said call conference by said conference system;
   determining if any other users have entered the conference identifier; and
   if so, connecting the potential conferee to the other users.

3. The method of claim 2 further comprising the step of:
   if no other users have entered the conference identifier, maintaining a connection from said conference system to said potential conferee to await the entry of said conference identifier by other users, said step of maintaining occurring without first checking whether said conference identifier is previously stored at said switch.

4. The method of claim 2 further comprising the steps of establishing a connection from a conferee to a switch; and ending said connection if no other users enter said conference identifier within a predetermined time period.

5. The method of claim 2 wherein the conference identifier is stored on a user's terminal and transmitted from said terminal to said conference system.

6. The method of claim 2 further comprising the step of maintaining an audit trail of information related to billing of said conference call.

7. The method of claim 2 further comprising the steps of:
   sending a prompt message to a user who has entered the conference identifier only if no other users have previously entered the conference identifier;
   arranging for a new conference if said user enters a first response; and
   allowing the user to enter a different conference identifier if the user enters a second response.

8. The method of claim 2 further comprising the step of announcing to the other users that a new conferee is entering the conference.

9. A method of implementing a call conference in a conference system comprising the steps of:
   receiving at said conference system, a conference identifier from a first potential conferee, said conference identifier not being prestored by said conference system;
   maintaining a connection from said conference system to said potential conferee while checking for the entry of said conference identifier by other potential conferees; and
   upon said entry, establishing the conference.

10. The method of claim 9 wherein said connection is ended if said entry of said conference identifier by said other potential conferees does not occur within a predetermined time.

11. A method of implementing a conference call comprising the steps of:
   a) selecting and agreeing upon a conference identifier;
   b) dialing a telephone number corresponding to a conferencing apparatus;
   c) transmitting to the conferencing apparatus the selected and agreed upon conference identifier without previously allocating said identifier at the conferencing system;
   d) forming the conference call among all conferees who perform steps b) and c).

12. The method of claim 11 further comprising the step of prompting the first conferee who performs step C to ensure that said first conferee has not mistakenly entered an incorrect conference identifier.

* * * * *